Patented June 8, 1937

2,083,180

UNITED STATES PATENT OFFICE 2,083,180

CLINKER BRICK REFRACTORIES

Lincoln T. Work, New York, N. Y.

No Drawing. Application September 12, 1935, Serial No. 40,345

7 Claims. (Cl. 106—9)

The present invention relates to refractories, and is concerned more particularly with the binding together of Portland cement clinker particles whereby to make a refractory article or body for use in the cement kiln or in other applications where generally similar temperature conditions prevail and where an alkaline refractory of this type may be used. Such refractory must not only withstand the action of high temperature heat and abrasion on the inner face, but be strong throughout and resistant to temperature changes and long periods of shutdown after use.

In the manufacture of Portland cement a finely ground mixture of limestone and clay is heated to a temperature approximating 1300–1400° C., during which reaction takes place, and some liquid is formed which causes the reacting material to form into balls as it slides within the shell of a rotary kiln. Refractories used at the hot end of the kiln are subjected to temperatures somewhat above clinkering temperature by the action of a flame, commonly produced by the burning of powdered coal. Further, the alkaline nature of the clinkering material causes a reaction with acidic ingredients of the ordinary types of refractory such as fire clay: these acidic refractories are reacted with the lime of the raw mixture, or even with the alkaline silicates and aluminates which are formed during clinkering, whereby to form less alkaline compounds of the same type, which latter compounds melt at lower temperatures than that of the cement clinker and are gradually washed away by the abraiding and absorptive action of the clinker, with the result that the refractory wall becomes too thin and the shell of the kiln is burned and distorted by excess heat. To obviate this, the flame in the kiln generally is so adjusted as to cause a coating of clinker material to cement itself to the lower melting silicates and aluminates formed with the brick, this being effected by the action of heating and cooling. The coating so produced acts as the lining for the kiln. This expedient, however, only slows the rate of reaction between clinker and fire brick, and, in the case of overheating at any time, the reaction may again go on at a rapid rate.

Since the ring of clinker coating produced as above described has been shown by practice to be a suitable lining material, it would appear feasible to make a refractory brick in which cement clinker was the chief ingredient. The economic advantages of making a cold pressed brick or a bonded monolithic lining, which could be done at the cement plant, are obvious. A number of efforts have been made in that direction. For example, clinker and cement have been used and tamped into place in the kiln. Such a mixture should be ideal in that the cement would not lower the melting point of the refractory appreciably. However, it does shrink on sintering, and cracks are opened in the face of such a lining. Furthermore, cement on hydrating evolves calcium hydroxide, which on heating to approximately 550° C. is decomposed to calcium oxide with a degeneration of the bonding structure. Furthermore, when a lining of this type is allowed to stand unheated, moisture is absorbed and there is an action of swelling which causes the ultimate disintegration of the lining. In my experiments I have found that Portland cement, lime and calcium carbonate all produce this disintegrating effect, when brick which has been heated thereafter is subjected to atmospheric action, and it is only when such free lime is removed by reaction, as with silicates, or when the particles are small, that the action no longer takes place. Reference to this characteristic is given in U. S. Patent No. 927,585 to Newberry: in that case the inventor improved upon clinker, ground cement, and water by pulverizing the clinker to a coarse powder of 10 or 20 mesh, and molded this material, containing its natural fines content, with an alkaline earth and sintered the molded material, the sintering action appearing to create the necessary bond through the entire block. Other inventors have modified the bond to include clay and cement (U. S. Patent No. 944,693 to Pope), or by the use of fusible halides, such as calcium chloride, to bond clinker (U. S. Patent No. 1,156,018 to Newberry). In the patent literature the use of low melting bonds, such as a lower melting cement, with a higher melting clinker, borax and other suitable fluxing materials, has been discussed. In none of these is the primary requirement met, viz., that the bond shall ultimately be of high melting point and that the bond shall not materially alter the temperature at which the brick will be melted. In this respect among others my invention differs from the compositions cited in the prior art.

In the prior art of molding brick of this general type it has been recognized that the density of the brick may to some extent be determined by the size distribution of the aggregates contained therein. Recognition of this fact was disclosed in, for instance, U. S. Patent No. 944,692 to Pope, in which case it was recommended that the aggregate be sorted into two sizes, viz., above ⅛ inch and below ⅛ inch, and that equal parts of each size to be used with a suitable proportion of cement and water. More recently, in U. S. Patent No. 1,851,181 to Heuer, it was proposed so to grade the aggregate of a refractory brick composition that the latter contained coarse sizes and fine sizes with a relatively lesser amount of the intermediately sized particles, in contrast with the normal distribution encountered by direct grinding.

The prior art has thus defined the binding together of Portland cement clinker with cement, borax, water-glass, calcium chloride, and the like. It also has indicated that high density is essential in the finished brick, and that high density may be obtained by appropriate grading of the aggregates so that they possess a distribution curve not naturally obtained in grinding. This principle of grading for maximum density is a well known principle not only in the refractory art but in the design of concrete mixtures, the construction of macadam roads, and the like. It has also been indicated that high density could be secured by a high degree of compression in molding, but such compression heretofore has not been applied in the molding of clinker refractory.

Separately and together the prior art applications of these principles have not been adequate for the construction of a satisfactory clinker brick. For example, when Portland cement and graded clinker are molded under high pressure, the resultant brick disintegrates in the zone of weakness caused by the distintegration of the cement at temperatures such as 500–1000° C. Where, on the other hand, a highly fusible ingredient is used, the melting point of the resultant mixture is normally lower, and the brick, which must stand temperatures equal to the clinker, will be softer than the clinker mass and therefore be easily eroded.

Having in mind the defects of the prior art proposals, it is an object of the present invention to provide a process of making a refractory article (e. g., brick) or unitary mass in which process refractory aggregate, e. g., substantially chemically inert refractory aggregate, is bonded together by a refractory bond produced in situ, which bond shall have a materially higher temperature of fusion than were the temperatures of fusion of the constituents from which it was formed.

It is a further object of my invention to provide a refractory brick or object, using clinker as aggregate, which will possess satisfactory strength and resistance to disintegrating influences in the intermediate zone, where linings of this type usually fail, the refractory brick, at the same time, to be of such a composition that the melting point of the clinker will not be appreciably lowered by the bonding agent used. More specifically it is an object of my invention to provide a dense refractory brick, consisting essentially of clinker and a binder, in which the binder dries to a hard mass under ordinary conditions, is fusible in the critical range of 500°–1000° C., and at or about the clinkering temperature reacts within its own ingredients to produce a bond which does not lower the melting point of the face of the brick.

The foregoing and other objects related thereto are attained in accordance with the following process illustrative of the invention: Portland cement clinker is crushed to a size less than ¼ inch or ½ inch, or fine clinker may be used alone or in combination with such crushed clinker. Through this grading there is attained a size distribution in which particles of 10 mesh and coarser represent approximately 60% of the entire mass. The undersize may be sieved by the well known principles of grading to obtain a maximum density. For example, a mixture useful in carrying out the present invention may contain 60% of 4 to 10 mesh, 10% of 10 to 40 mesh, and 30% of 40 to 100 mesh material, but it is not necessary to limit the material under 10 mesh except to indicate that its distribution shall be such as to cause the total mixture to approach a maximum apparent density for the finally adopted clinker. To this clinker may be added up to 6% to 10% of its weight of finer clinker, i. e., 100 mesh, but preferably not of the fineness of Portland cement. The fluid bond which I use with this aggregate is water-glass solution or, preferably, a suspension of borax in water-glass. The water-glass possesses the property of drying to a hard mass and binding the particles together. The water-glass and borax are fusible, and at the intermediate temperature zone of 500–1000° C. produce a sintering effect upon the clinker. At higher temperatures these ingredients, being low in melting point, would make a surface susceptible to heat and easily slagged. To counteract this effect, I add to the above binder a reactive ingredient, such as calcium sulphate or finely divided calcium carbonate, which by reaction will release volatile sodium salts and form tricalcium silicate in the clinker face of the brick.

The molding of the brick is done under pressure in order to secure a dense brick and to secure economy through the use of less binder.

Other auxiliary treatments include the use of molding lubricants, such as stearic acid, aluminum stearate, and the like, which permit the use of less water with the water-glass.

Certain typical compositions which I use are listed, but I do not restrict myself to the ranges here indicated save to conform in principle with the definition of this invention. In these specific examples, the expression "graded clinker" means clinker particles ranging from 4 to 100 mesh, graded for maximum density.

*Composition No. 1*

| | Percent |
|---|---|
| Graded clinker | 79 |
| Clinker fines 100–200 | 3 |
| Clinker fines sub 200 | 3 |
| Anhydrous calcium sulphate | 12 |
| Borax | 3 |

To each 100 grams of this mixture are added 6.3 cc. of water-glass, high alkaline content, and 7.3 cc. of water. The mixture is pressed at 5,000 to 10,000 pounds per square inch.

*Composition No. 2*

| | Percent |
|---|---|
| Graded clinker | 81.5 |
| Clinker fines 100–200 | 2.8 |
| Clinker fines sub 200 | 2.7 |
| Borax | 2 |
| Asbestos | 1 |
| Precipitated chalk | 4 |
| Dehydrated plaster of Paris | 6 |

To each 100 grams of this mixture are added 4 cc. of sodium silicate and 6 cc. of water, and the mixture is molded at 5,000 to 10,000 pounds per square inch.

*Composition No. 3*

| | Percent |
|---|---|
| Graded clinker | 78.8 |
| Clinker fines 100–200 | 2.7 |
| Clinker fines sub 200 | 2.75 |
| Borax | 3 |
| Asbestos | 2 |
| Precipitated chalk | 4 |
| Anhydrite ($CaSO_4$) | 6 |
| Stearic acid | .75 |

To each 100 grams of this mixture is added 5 cc. of water-glass without dilution.

These typify compositions which have been found satisfactory and which are a marked improvement over the prior art.

In the investigation of the foregoing compositions the following melting points have been found:

| Composition | Melting point (° C.) |
|---|---|
| 93.75% clinker; 6.25% CaSO₄; 2.2 cc. water-glass per 100 gms. | 1,545 |
| 100% clinker | 1,540 |
| 3% sodium chloride; 97% clinker | 1,520 |
| 5% calcium borate; 95% clinker | 1,515 |
| 5% G. C. brand sodium silicate; 95% clinker | 1,505 |
| 5% borax; 95% clinker | 1,490 |

It is to be noted that water-glass alone with clinker, and that borax alone with clinker, reduce the melting point of the resulting mixture by 40° or 50° C., whereas calcium borate, formed by the reaction of borax and lime, does not lower the melting point to that extent, and a binder of calcium sulphate and water-glass actually increases the melting point slightly. Furthermore, I have found that a refractory compressed brick produced from a certain mixture of clinker, anhydrous calcium sulphate, and water-glass yields the following compressive strengths when heated to stated temperatures and cooled:

| Treatment | Compressive strengths in lbs. per sq. in. |
|---|---|
| Heated to 104° C. | 4,720 |
| Heated to 585° C. | 3,050 |
| Heated to 950° C. | 1,545 |
| Heated to 940° C., cooled, dipped in water and dried | 2,180 |

I also find that compressive strength is greatly influenced by molding pressure, and I prefer in the embodiment of this invention to utilize the highest possible molding pressure. For example, a mixture of clinker, borax, and water-glass was molded at several pressures, damp cured, and heated to 950° C. The pressures applied in the molding are, in the following table, compared with the compressive strengths of the specimens after this heating:

| Molding pressure (lbs. per sq. in.) | Compressive strength in lbs. per sq. in. |
|---|---|
| 16,000 | 4,340 |
| 8,000 | 2,820 |
| 4,000 | 1,765 |
| 960 | 431 |

It is obvious from the disclosure that the graded material molded at high pressures, i. e., 5,000 to 10,000 pounds per square inch and preferably higher, possesses strength when subjected to heating at temperatures which, in the case of normal molded clinker refractories, are critical, and also possesses a melting point sufficiently high after reaction has taken place that the lining shall not be slagged out by the clinker.

In the foregoing, the invention has been described and illustrated from the viewpoint of producing a refractory article from Portland cement clinker. It will be appreciated, however, that the invention in its larger aspects is not limited as to the aggregate employed.

I claim:

1. Process of making refractory articles which comprises admixing with refractory aggregate a fluid bonding agent including water glass and a calcium compound which is reactive with water glass to produce a calcium silicate bond containing a material amount of tricalcium silicate and having a higher fusion temperature than the temperature of reaction of water glass and the compound, and forming the mixture into shapes.

2. Process of making refractory articles, as defined in claim 1, in which the mixture is formed into shapes by molding.

3. Process of making refractory articles, as defined in claim 1, in which the mixture is formed into shapes by molding under high compression.

4. Process of making refractory articles which comprises admixing with substantially inert refractory aggregate borax, water glass and a calcium compound which is reactive with water glass at a temperature above about 1000° C., the ratio of calcium compound to water glass being such as to yield a calcium silicate bond containing a material amount of tricalcium silicate, and forming the mixture into shapes.

5. Process as defined in claim 1, in which the metal compound is calcium sulphate.

6. A molded and highly compressed refractory consisting essentially of an aggregate including Portland cement clinker and a bond capable of exerting cementing action towards the aggregate at low, intermediate and high cement kiln temperatures, said bond being characterized in that it consists largely of calcium silicate of which a material amount is in the form of tricalcium silicate.

7. A molded refractory consisting essentially of a refractory aggregate, sized to optimum density and comprising Portland cement clinker, and a bond formed in situ and comprising the refractory reaction products of water glass, borax and a calcium salt, the bond being additionally characterized in that it contains a material amount of tricalcium silicate.

LINCOLN T. WORK.